HYDRAULIC SHIFTING MECHANISM FOR A MECHANICAL TRANSMISSION

Original Filed Sept. 14, 1970 2 Sheets-Sheet 1

INVENTOR
DONALD S. DENCE
BY Paul K. Gallagher
ATTORNEY

HYDRAULIC SHIFTING MECHANISM FOR A MECHANICAL TRANSMISSION

Original Filed Sept. 14, 1970 2 Sheets-Sheet 2

INVENTOR
DONALD S. DENCE
BY
Paul K. Gallagher
ATTORNEY

United States Patent Office

Re. 28,017
Reissued May 21, 1974

28,017
HYDRAULIC SHIFTING MECHANISM FOR A MECHANICAL TRANSMISSION

Donald S. Dence, Brooklyn, Mich., assignor to Clark Equipment Company

Original No. 3,677,105, dated July 18, 1972, Ser. No. 71,717, Sept. 14, 1970. Application for reissue May 21, 1973, Ser. No. 361,957
Int. Cl. G05g *5/10, 9/12*
U.S. Cl. 74—477 10 Claims

Matter enclosed in heavy brackets [ ] appears in the original patent but forms no part of this reissue specification; matter printed in italics indicates the additions made by reissue.

ABSTRACT OF THE DISCLOSURE

A hydraulic shifting mechanism for a mechanical transmission of the type having a plurality of shiftable pistons for producing corresponding shifting movements in the transmission, and having a manual shift lever and three pistons, including a lower central one and two upper, laterally-spaced ones, the shift lever being movable laterally for selectively engaging the pistons, and movable fore-and-back for shifting the selected piston; the shift lever has a lower end engageable with the selected piston, and is incorporated in a unit having side elements movable laterally with the shift lever but fixed against fore-and-back movement, the pistons having notches and grooves receiving the side elements; the side elements when the shift lever is in neutral or central position, respectively restain the corresponding upper pistons against fore-and-back movement and when the shift lever is moved laterally in either direction, one of the side elements releases the corresponding upper piston and restrains the lower piston against fore-and-back movement, while the other side element continues to restrain its corresponding upper piston.

OBJECTS OF THE INVENTION

A broad object of the invention is to provide a shifting mechanism for a mechanical transmission which is of extremely simple construction, resulting in economy in manufacture and in assembly of the parts.

Another object is to provide in a mechanical transmission having a plurality of shiftable pistons, a shift lever unit having a plurality of elements respectively engaging and controlling the movements of the different pistons, and wherein all of those elements move together in unison, in at least one sense, in the shifting movements of the shift lever.

Still another object is to provide a gear shift mechanism of the foregoing character which is a very small and compact construction, resulting in economy in size of the components making up the shifting phase of the transmission.

Still another object is to provide a shift mechanism of the foregoing character which includes a shift lever unit incorporating a shift lever and a hanger in which the shift lever is mounted, and further in which the shift lever and the hanger are each rigid elements and include all of the elements engageable with the pistons for respectively shifting them and restraining shifting movements thereof.

DESCRIPTION OF A PREFERRED EMBODIMENT

Figure 1:
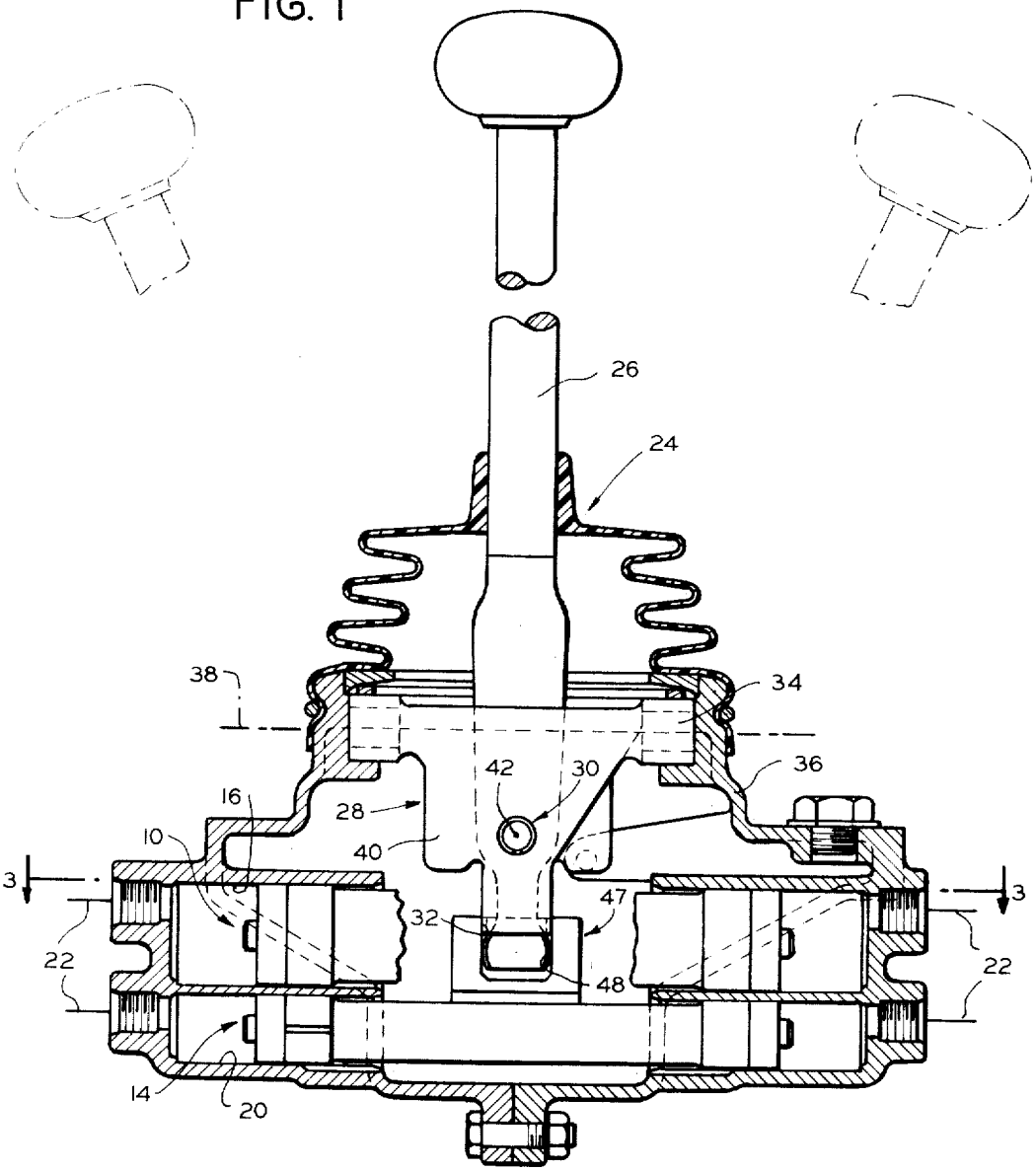
FIG. 1 is a vertical axial sectional view of a transmission shifting mechanism embodying the features of the present invention.
Figure 2:
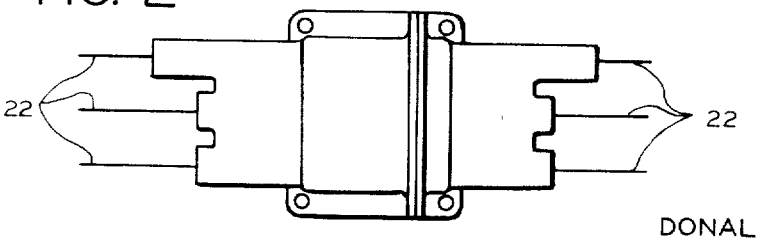
FIG. 2 is a semi-diagrammatic view of a servo hydraulic unit actuated by the mechanism of FIG. 1, and which in turn produces the actual shifting of the shift rails in the transmission.

Referring in detail to the accompanying drawings, FIG. 1 shows a shifting mechanism including the construction embodying the features of the present invention and which may also be referred to as a master unit. FIG. 2 shows a servo unit directly connected with and controlled by the master unit of FIG. 1 as will be referred to again hereinbelow.

Figure 5:
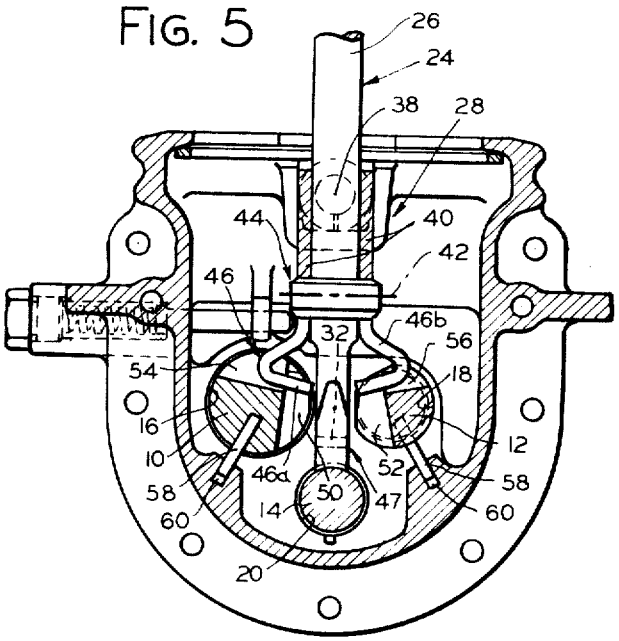
FIG. 5 is a view taken at line 5—5 of FIG. 3.
Figure 3:
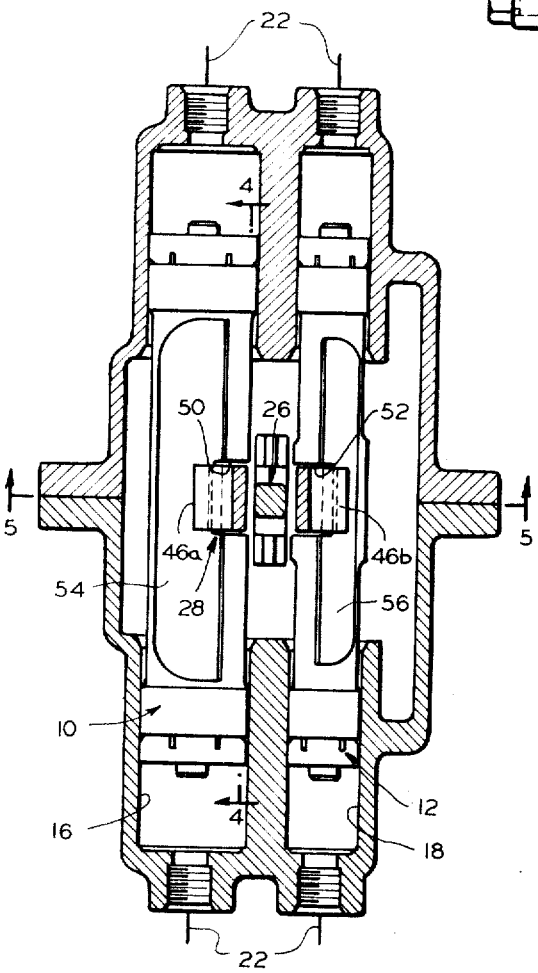
FIG. 3 is a view taken at line 3—3 of FIG. 1.
Figure 4:
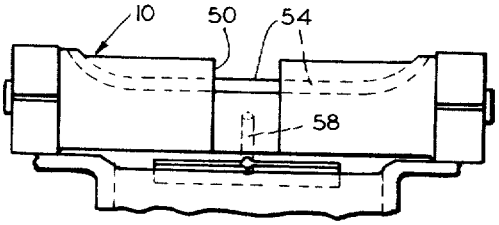
FIG. 4 is a view taken at line 4—4 of FIG. 3.

The master unit or mechanism of FIG. 1 is also shown in various stages and sections in FIGS. 3, 4 and 5 and includes a plurality of pistons 10, 12, and 14 working in cylinders 16, 18 and 20 for longitudinal shifting movement therein. The cylinders are connected with hydraulic lines 22 which lead to corresponding cylinders in the servo unit of FIG. 2. The servo unit includes pistons (not shown) corresponding individually with the pistons 10, 12, 14 in the master unit, and the pistons in the servo unit operate the shift rails of the transmission. The provision of the pistons in the master unit and in the servo unit and the hydraulic line connection therebetween, together, with the actuation of the shift rails in the transmission, is of generally known construction. The present invention relates to the specific construction of the master unit of FIG. 1.

The master unit of FIG. 1 includes gear shift lever unit 24 which includes a gear shift lever or stick 26 and a hanger 28. For convenience the shift lever unit is described as having a neutral or central position in which the shift lever 26 is vertical and the pistons in the unit are centered. The shift lever 26 *comprises a shaft* [is] pivoted at 30 in the hanger as referred to below, and its inner or lower end forms an extension *or shift element* 32 beyond the pivot axis for directly engaging the different pistons and shifting them.

The hanger 28 is formed preferably of a single sheet of metal, stamped and shaped into an inverted "U," having bearing members 34 supported in the housing 36 of the master unit. If desired the hanger may be of two separate pieces instead of one, and it is arranged for rocking or pivotal movement about a longitudinal axis 38 parallel to the pistons and disposed at the upper part of the housing. The hanger 28 is of course restrained against displacement longitudinally and it includes a pair of side plates 40 directly in which the shift lever 26 is pivotally mounted, being so mounted on an axis 42 transverse to the axis 38.

The side plates 40 of the hanger are secured together and in confining relationship to the shift lever 26 by suitable means indicated at 44. The side plates of the hanger at their lower edges are provided with inturned feet or extension 46 individually identified 46a, 46b having direct engagement with the pistons as referred to hereinbelow, *and serving as blocking elements.*

The pistons 10, 12, 14 are provided with special construction for control and actuation by the shift lever unit 24. In the neutral position of the gear shift lever unit referred to, the hanger 28 is also vertically disposed. The shift lever 26 is pivotal in fore-and-back directions about the transverse axis 42, when the hanger is in its vertical position. The shift lever and the hanger together as a unit are also shiftable transversely about the longitudinal axis 38, from the vertical position of the shift lever.

The piston 14 is disposed lowermost and centrally, and has a fork 47 having a notch 48 opening transversely in both directions. The pistons 10, 12 are uppermost and spaced apart laterally on opposite sides of a vertical plane containing the axis of the lower piston 14. The pistons 10, 12 have interfacing vertical notches 50, 52 of an axial dimension similar to the corresponding dimension of the feet 46a, 46b (FIG. 3) *and extending vertically through the pistons,* and they also have longitudinally extending grooves 54, 56 on their upper sides, and on their sides generally mutually opposite from each other and of the length along the pistons corresponding to the extent of shifting of the pistons.

The upper pistons 10, 12 are provided with radial pins 58 slidable in longitudinal slots 60 (see also FIG. 4) for restraining those pistons against rotational displacement. The lower piston 14 is restrained against rotation by confinement of the fork 47 between the upper pistons 10, 12.

In the operation of the master unit, the neutral position is first assumed, as represented in FIGS. 1 and 5, in which the shift lever is in vertical position and the hanger 28 is necessarily also in a vertical position. In this position the lower extenson 32 of the shift lever is disposed in the fork 47. Also in this position, the feet 46 are disposed at least partially in the notches 50, 52 of the upper pistons 10, 12. The shift lever 26 can then be shifted fore-and-back about the transverse axis 42 and this movement shifts the lower central piston 14, while the feet 46, being disposed in the notches 50, 52 restrain *or block* the shifting of the upper pistons.

Figure 6:
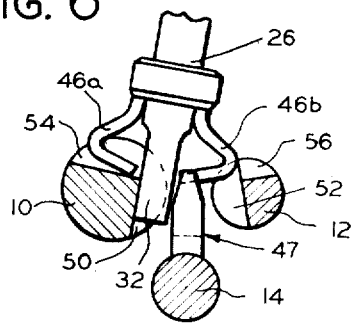
FIG. 6 is a view showing the central portion of FIG. 5 but with certain elements in a first shifted position.
Figure 7:
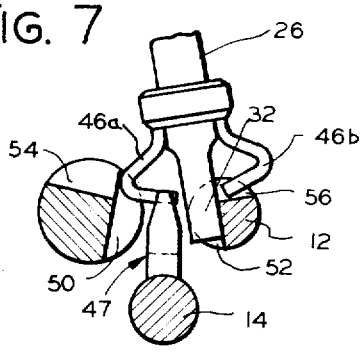
FIG. 7 is a view similar to FIG. 6 but with those elements in the opposite shifted position.

To shift the piston 10, the lever 26 is shifted to the "right" (FIGS. 5–7), i.e., clockwise about the axis 38, this movement also shifting or swinging the hanger 28. In this shifting movement, the lower extension 32 of the shift lever swings to the left out of the fork 47 (FIG. 6) and into the notch 50 of the piston 10, and at the same time the foot 46b of the hanger moves from the position of FIG. 5 to that of FIG. 6 in which it is partially in the notch 52 and partially in the notch 48 of the fork 47, while the other foot 46a is shifted out of the notch 50 and into the longitudinal groove 54. In this position of the various elements, the shift lever 26 can be shifted fore-and-back about the axis 42, and in doing so it shifts the piston 10, the foot 46a being in the groove 54 enabling shifting of that piston, while the other foot 46b being disposed in the notch 52 and in the fork 47, restrains *or blocks* both the pistons 12, 14 against shifting movement.

To shift the piston 12, a similar operation is performed, but in the opposite movement of the shift lever 26, i.e., the lever is shifted to the "left," or counterclockwise about the longitudinal axis 38, this shifting movement moving the extension 32 of the shift lever into the notch 52 (FIG. 7) of the piston 12. At the same time the foot 46b is moved into the longitudinal groove 56 while the other 46a is moved into a position in which it is partially in the notch 50 and partially in the fork 47. In such situation, the shift lever may then again be shifted fore-and-back about the transverse axis 42 in a manner described above, shifting the piston 12 while the other two pistons are restrained *or blocked* against shifting movement by the foot 46a.

*The feet or blocking elements 46, and consequently the shift element 32, are positioned substantially or nearly within the transverse limits of the pistons in all positions of transverse movement of the blocking elements and shift element.*

It will be understood that the shift lever 26 cannot be shifted transversely when in either fore or back position, being confined against such movements by which ever foot 46a or 46b is disposed in the corresponding groove 54 or 56, that foot being obstructed by engagement with the side wall of that groove.

The construction is of extremely simple form, the shift lever unit 24 being shiftable as a unit in transverse directions about the longitudinal axis 38, while the lever 26 above is shiftable fore-and-back relative to the hanger, both when the hanger is disposed vertically, and when in either side from its vertical position. In all cases the inner extension of 32 of the lever directly engages the selected piston itself and shifts it in response to fore-and-back shifting movements of the lever. Also the feet 46 of the plates of the hanger directly engage the respective pistons and restrain the non-selected pistons, i.e., whether the two upper side pistons, or one of those and the lower piston, respectively, depending upon the shifted position of the shift lever. The construction of the shift lever and hanger is extremely simple, the lever and the feet 46 of the hanger all shifting in unison in response to the transverse shifting movement of the lever, this simple construction contrasted to most previously known construction in which separate elements, such as forks, are individually moved relative to the corresponding pistons. The present construction results in a single element (32) for directly engaging and shifting the pistons and two elements (46a, 46b) for restraining the non-selected pistons.

I claim:

1. A shifting mechanism for a mechanical transmission comprising a plurality of longitudinally shiftable pistons including a lower central one and a pair of upper ones spaced laterally on opposite sides of a vertical plane containing the lower one, a shift lever unit having a central position including a hanger having a pair of side plates mounted for transverse rocking movement on a longitudinal axis, but fixed against longitudinal movement, and a shift lever carried by the hanger for transverse movement therewith and pivoted therein and relative thereto for longitudinal fore-and-back shifting movement about a transverse axis, the lower central piston having a transversely opening fork, the upper pistons having transverse notches facing each other and longitudinally extending grooves mutually outwardly from the notches, the shift lever having a downwardly projecting shift element and the side plates of the hanger having transversely extending feet at their lower ends, the elements being so positioned that when the shift lever unit is in its central position, the shift element of the shift lever is in the fork on the lower piston, and the feet of the hanger are in the notches in the upper pistons, the shift lever when in said central position being shiftable in fore-and-back directions and thereby correspondingly shifting the lower central piston and the feet on the hanger plates restrain the upper side pistons against such shifting movement, the shift lever unit when shifted laterally from its central position moving the shift element out of the fork on the lower central piston and into the notch of a first of the upper side pistons and the foot of the hanger plate in that piston being moved from the notch therein into the longitudinal groove therein, and in the same movement the foot in the opposite hanger plate moving to a corresponding position in which a portion of it remains in the notch in the second of the upper side pistons and a portion of it is disposed in the fork of the central lower piston, and the shift lever when so moved laterally being operative for longitudinally shifting the first piston and the foot in the hanger plate on the other side being effective for restraining the second upper side piston and the lower central piston.

2. A shifting mechanism for a transmission, comprising, a plurality of longitudinally shiftable pistons including a lower central one and a pair of upper ones on opposite sides of a central vertical plane containing the lower piston,

[a] *the* lower piston having a transversely opening notch, the upper pistons having transversely directed, interfacing notches transversely aligned with said notch in the lower piston when the pistons are centered.

the upper pistons also having longitudinal grooves on their upper sides displaced mutually outwardly from the notches therein, a shift lever unit including a hanger formed of a plate in the form of an inverted "U" with an upper bend portion of substantial longitudinal dimensions and downwardly depending side legs, the hanger being pivoted at its said upper bend portion on a longitudinal first axis above the pistons but fixed against displacement along that axis, the hanger having inwardly turned feet at the lower ends of the legs of longitudinal dimensions similar to that of said notches and insertable into the notches variously, the shift lever unit also including a shift lever between the side legs of the hanger and pivoted therein on a second axis transverse to and below said first axis, the shift lever and hanger being swingable as a unit transversely on said first axis when the shift lever is vertical and the pistons are centered, the shift lever being swingable longitudinally on said transverse second axis between said legs of the hanger throughout a substantial distance as guided and confined by those legs, the shift lever having a lower end extension below said second axis extendable into respective ones of said notches in response to transverse swinging movement of the shift lever and hanger transversely about said first axis and operative in response to longitudinal swinging of the shift lever about said transverse second axis for shifting a respective one of the pistons, and said feet being disposed respectively in corresponding notches in the pistons in which the lower end extension is not disposed whereby to restrain longitudinal movement of the latter pistons.

*3. A transmission shift mechanism comprising,*

*a plurality of cylinders, and pistons slidable longitudinally therein, for displacing fluid controlling transmission actuation,*

*a shift lever having a shift element movable transversely relative to the pistons,*

*each piston having a notch receiving said shift element in response to transverse movement of the shift element, when the latter is moved toward the respective piston in selecting the latter, and*

*means mounting the shift element for the transverse movement of the latter and being also movable transversely with the shift element, and the shift element being movable longitudinally in and relative to the mounting means and thereby operative for correspondingly sliding the selected piston,*

*said mounting means having blocking elements adjacent to the shift element and movable transversely therewith and engageable with the non-selected pistons and operative for blocking the latter against longitudinal sliding,*

*said blocking elements and said shift element being positioned substantially within the transverse limits of the pistons in all positions of transverse movement of the blocking elements and shift element.*

*4. A transmission shift mechanism according to claim 3, wherein the pistons are at least three in number, the blocking elements include one on each side of the shift element, and when the shift element is in operative position relative to one of the side pistons, the blocking element remote from the latter piston is operative for blocking all non-selected pistons.*

*5. A transmission shift mechanism according to claim 3 wherein the mounting means includes a plate-like member in the form of an inverted "U" pivoted at an upper point and having downwardly extending side plate elements, and the latter having feet at their lower ends extending generally inwardly toward each other on opposite sides of the shift element and constituting said blocking elements.*

*6. A transmission shift mechanism according to claim 3 wherein the pistons include the upper transversely spaced pistons respectively on opposite sides of the shift element and engageable thereby and serving as means for limiting the transverse movement of the shift element.*

*7. A transmission shift mechanism according to claim 3 wherein the pistons are at least three in number—a lower central one and a pair of upper transversely spaced ones, the lower piston has a fork extending upwardly between the upper pistons, forming said notch in the lower one, the fork being engageable with the upper pistons and the latter serving to restrain the lower piston against rotational displacement.*

*8. A transmission shift mechanism according to claim 6 wherein the upper pistons are closely adjacent the shift element and operative for restraining transverse movement of the shift element when the latter is out of alignment with the notches in those pistons.*

*9. A transmission shift mechanism according to claim 3 wherein the pistons include a pair of upper pistons respectively on opposite sides of the shift element, and the notches in those pistons are on the interfacing sides thereof and extend vertically entirely through the pistons, whereby to receive the shift element substantially throughout the vertical extent of that portion of the latter that is within the horizontal projection of the pistons.*

*10. A transmission shift mechanism according to claim 9 wherein the pistons are slidable in both of opposite directions, the upper pistons are provided with longitudinal grooves of a length at least as great as the extent of sliding of the pistons in both directions, and disposed laterally outwardly of the respective notches in the pistons, whereby when the shift element is moved to one of the upper pistons in a selecting step, the corresponding blocking element that normally blocks that selected piston moves transversely into the corresponding groove whereby to accommodate sliding movement of the piston.*

References Cited

The following references, cited by the Examiner, are of record in the patented file of this patent or the original patent.

UNITED STATES PATENTS

| | | | |
|---|---|---|---|
| 2,178,061 | 10/1939 | Bachman et al. | 74—346 |
| 3,264,895 | 8/1966 | Turunen | 74—477 |
| 3,602,060 | 8/1971 | Magg | 74—477 |

FOREIGN PATENTS

| | | | |
|---|---|---|---|
| 252,291 | 5/1926 | Great Britain | 74—477 |

ALLAN D. HERRMANN, Primary Examiner